(12) United States Patent
Gann

(10) Patent No.: US 9,167,024 B2
(45) Date of Patent: Oct. 20, 2015

(54) FORMATTED DATA FILE COMMUNICATION

(75) Inventor: Robert Gregory Gann, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1409 days.

(21) Appl. No.: 12/424,679

(22) Filed: Apr. 16, 2009

(65) Prior Publication Data
US 2010/0268846 A1   Oct. 21, 2010

(51) Int. Cl.
*H04L 29/08*   (2006.01)
*H04N 21/472*   (2011.01)
*H04N 21/81*   (2011.01)
*H04L 29/06*   (2006.01)

(52) U.S. Cl.
CPC .............. *H04L 67/06* (2013.01); *H04N 21/472* (2013.01); *H04N 21/8153* (2013.01); *H04L 65/80* (2013.01)

(58) Field of Classification Search
USPC ....................... 709/246; 725/86; 345/428, 619
See application file for complete search history.

(56) References Cited

U.S. PATENT DOCUMENTS

| | | | |
|---|---|---|---|
| 5,515,176 A * | 5/1996 | Galen et al. | 358/403 |
| 2002/0038343 A1* | 3/2002 | Masera | 709/203 |
| 2002/0091850 A1* | 7/2002 | Perholtz et al. | 709/231 |
| 2002/0120781 A1* | 8/2002 | Hirashima et al. | 709/246 |
| 2002/0169823 A1* | 11/2002 | Coulombe et al. | 709/203 |
| 2005/0221858 A1* | 10/2005 | Hoddie | 455/557 |
| 2005/0271022 A1 | 12/2005 | Osawa | |
| 2007/0035764 A1 | 2/2007 | Aldrich | |
| 2008/0024520 A1 | 1/2008 | Rudd | |
| 2008/0288576 A1 | 11/2008 | Carlson | |

* cited by examiner

*Primary Examiner* — Ranodhi Serrao
(74) *Attorney, Agent, or Firm* — Hewlett-Packard Patent Department

(57) ABSTRACT

Methods and systems are provided. A sending device offers to provide a graphic image to a receiving device by way of a network. The receiving device responds by providing desired parameters including an overall file size to the sending device. A data file formatted according to the desired parameters is provided to the receiving device. The sending device or another entity can be the source of the data file.

15 Claims, 3 Drawing Sheets

FORMATTED DATA FILE COMMUNICATION

BACKGROUND

Users of various electronic devices such as digital cameras, laptop computers, etc., often seek to exchange graphic images such as photographs, video segments and the like. Such devices are often coupled to each other through networks such as the Internet. A problem arises when a source image file is defined by one or more characteristics that are incompatible with; or otherwise undesirable to, a proposed receiving device.

Accordingly, the embodiments described hereinafter were developed in the interest of addressing the foregoing matters.

BRIEF DESCRIPTION OF THE DRAWINGS

The present embodiments will now be described, by way of example, with reference to the accompanying drawings, in which.

DETAILED DESCRIPTION

Introduction

Means and methods for providing data files of still and video images are presented. An offer to provide one or more graphic images is transmitted from a sending device to a receiving device. One or more parameters for the corresponding data file(s) are determined and communicated back to the sending device in response to the offer. The receiving device can optionally consult a services provider or other entity in the course of determining some or all of the desired parameters. The sending device derives a data file formatted in accordance with the requested parameters. In the alternative, a referral to a third-party source of the formatted data file is provided to the receiving device. The formatted data file is provided to the receiving device. Communication of customformatted data files corresponding to graphic images is thus contemplated.

In one embodiment, a method includes communicating an offer to provide at least one graphic image from a first device to a second device. The offer is communicated by way of a network linking the first device to the second device. The method also includes receiving a desired overall file size for the at least one graphic image from the second device, and formatting a data file representing the at least one graphic image in accordance with the desired overall file size. The method further includes communicating the data file from the first device to the second device by way of the network.

In another embodiment, a method includes receiving an offer for at least one graphic image from a first device at a second device. The offer is provided by way of a network. The method also includes determining one or more desired parameters for the at least one graphic image at the second device. At least one of the desired parameters corresponds to an overall file size for the at least one graphic image. Additionally, the method includes communicating the one or more desired parameters from the second device to the first device by way of the network. The method further includes receiving a data file corresponding to the at least one graphic image at the second device. The data file is formatted in accordance with the one or more desired parameters.

In yet another embodiment, a system includes a network and a first device coupled to the network. The first device is configured to provide at least one graphic image as a data file formatted in accordance with one or more parameters. The system also includes a second device coupled to the network and configured to receive an offer for the at least one graphic image from the first device. The second device is further configured to respond to the offer with one or more desired parameters for the at least one graphic image. The desired parameters include an overall file size for the data file.

First Illustrative System

Figure 1:
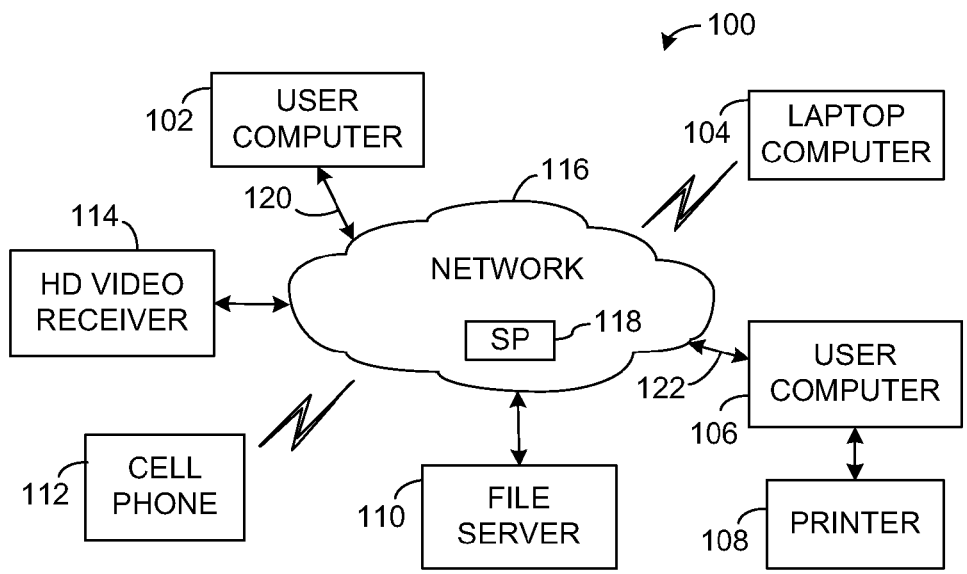
FIG. 1 depicts a block diagram of a system according to one embodiment.

Reference is now made to FIG. 1, which depicts a system 100 according to one embodiment. The system 100 is illustrative and non-limiting with respect to the present teachings. Thus, any number of other systems can be defined and operated in accordance with the teachings herein.

The system 100 includes a user computer 102, a laptop computer 104, another user computer 106 having an attached printer 108, a file server 110, a cellular telephone 112 and a high-definition (HD) video receiver 114 (e.g., television). The devices 102-114 are generally and respectively defined by known means. For example, the user computer 102 can be defined by a conventional desktop computer having a monitor, keyboard and mouse (not shown) and running in accordance with a known operating system. Likewise, the other devices 104-114 can be defined by known means.

It is to be understood, however, that the devices 102-114 further includes software, program code provided by firmware or other storage, dedicated-purpose electronic circuitry, etc., in order to operate in accordance with the present teachings. It is also to be understood that other respective systems including other types of devices such as, for non-limiting example, digital cameras, digital video recorders, digital personal assistants (PDAs), etc., can also be coupled to a suitable network and respectively configured to operate in accordance with the present teachings.

The various devices 102-114 are coupled to a network 116. The network 116 can be, for non-limiting example, the Internet. The network 116 includes a service provider (SP) 118 that operates to provide a data communications link between one or more of the devices 102-114 by way of the network 116. In one embodiment, the service provider 118 is a commercial entity that provides data communications linking in accordance with respective agreements (i.e., contracts) with one or more of the users of devices 102-114. Other kinds of service provider 118 can also be defined.

For purposes of non-limiting illustration, it is assumed that the user computer 102 communicates with the network 116 by way of a "broadband" link 120 that is established and maintained by the service provider 118. The link 120 is characterized by various physical characteristics such as, for example, maximum data transfer speed, etc. Additionally, certain operating parameters of the link 120 are defined and/or governed in accordance with an agreement between the user of the user computer 102 and the service provider 118. Examples of such contractual characteristics can include, for example, total data quantity to be transferred over the link 120 per unit time (e.g., megabytes per month), surcharge to transfer data files exceeding a certain overall size (e.g., ten megabytes, etc.), and so on. Similarly, it is further assumed that the user of the user computer 106 is coupled to the network 116 by way of "dial-up" link 122 established and maintained by the service provider 118. The dial-up link 122 is also characterized by respective physical and contractual operating parameters (e.g., maximum data transfer speed, cost per file size, etc.).

For purposes of understanding the present teachings, it is assumed that one or more of the devices 102-114 include (i.e., store) various graphic image files such as photographs, video clips, etc. It is further assumed that users of such devices 102-114 seek to share or exchange these graphic images with other users of the other devices 102-114. For non-limiting example, a user of the laptop computer 104 can seek to provide a digital video to a user of the HD receiver 114. Reference will be made to the illustrative system 100 as the present teachings are described hereinafter.

First Illustrative Method

Figure 2:
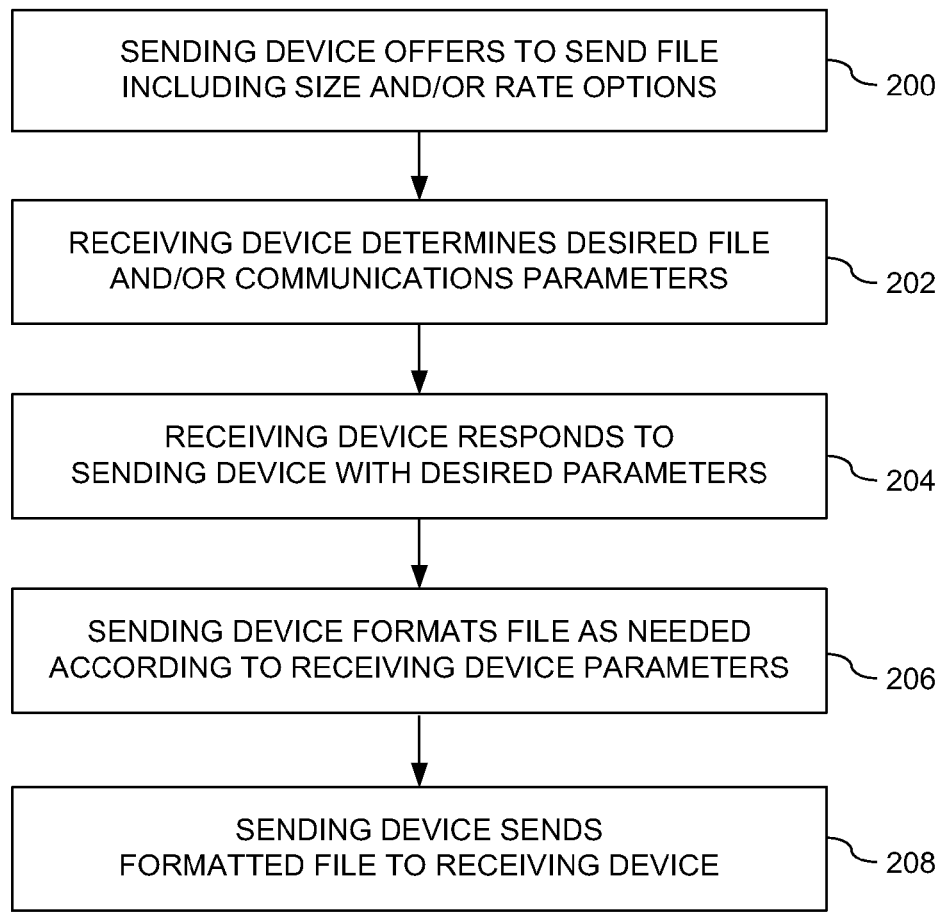
FIG. 2 depicts a flow diagram of a method according to one embodiment.

Referring now to FIG. 2, which depicts a flow diagram of a method in accordance with one embodiment. The method of FIG. 2 includes particular operations and order of execution. However, other methods including other operations, omitting one or more of the depicted operations, and/or proceeding in other orders of execution can also be used according to the present teachings. Thus, the method of FIG. 2 is illustrative and non-limiting in nature.

At 200, a sending device transmits an offer to provide a graphic image file to a proposed receiving device. For purposes of non-limiting example, it is assumed that the user computer 102 transmits an offer to provide a digital photograph to the user computer 106, by way of the network 116 and respective links 120 and 122. The offer is presumed to include information about the photograph such as, for example, resolution, original overall file size (e.g., six megabytes), etc.

At 202, the receiving device receives the offer and determines one or more desired parameters for the data file to be transferred. For non-limiting example, it is assumed that the user of the user computer 106 does not wish to receive graphic data files greater than two megabytes in overall file size. Thus, the user computer 106 prepares a response message in which the desired parameter of two megabytes maximum file size is included.

At 204, the receiving device responds to the sending device with the desired parameters for the graphic image file. For purposes of the ongoing example, it is assumed that the user computer 106 transmits a response to the user computer 102 by way of the network 116.

At 206, the sending device formats the graphic image as a data file in accordance with the one or more desired parameters provided by the receiving device. Such formatting can include, for non-limiting example, reducing (or enlarging) the overall image size, adjusting the color resolution (e.g., from 24 bit to 16 bit color, etc.), adjusting the image resolution, dropping one or more frames from a video segment, and/or other operations. For purposes of ongoing example, it is assumed that the user computer 102 formats the digital photograph as a data file not exceeding the two megabyte overall file size requested by user computer 106.

At 208, the sending device sends the formatted data file to the receiving device. For purposes of ongoing example, it is assumed that the user computer 102 sends the formatted data file representing the digital photograph to the user computer 106 by way of network 116 and respective links 120 and 122.

The method of FIG. 2 depicts one embodiment of the present teachings in which an offer is made to share a graphic image file, the offer is responded to with one or more desired parameters for the file and/or the manner in which it is communicated, and a data file is provided to the receiver in accordance with the desired parameters. For example, a receiving device (e.g., user computer 106) may be linked to a network (e.g., 116) in accordance with a service agreement with a service provider (e.g., 118). The terms of such an illustrative agreement can be such that a surcharge must be paid by the client for all files transmitted or received in excess of two-point-five megabytes in overall size. In another example, a service agreement is in place wherein a client device (e.g., user computer 106) is limited to two-hundred megabytes per month of data transfer over the corresponding link (e.g., link 122), or a surcharge is imposed.

In still another example, a cellular telephone (e.g., 112) has limited electronic display means and has no use for an image greater than seven-hundred sixty by four-hundred eighty pixels in size. In yet another example, a user computer (e.g., 106) has a high-end, large-format printer (e.g., 108) that can produce relatively large images on paper media at high resolution. In such a case, the user of the receiving device would like to receive the greatest image and color resolution that can be provided.

Thus, desired parameters for a graphic image data file can be based upon receiving device capabilities and/or limitations, capabilities and/or limitations of the communications link to the network, data file storage capacity, image processing-software resources, terms of agreement with a communications service provider, etc. These and numerous other factors can affect the determination of the desired parameters.

The foregoing method is illustrative of any number of methods contemplated by the present teachings. Numerous other methods consistent with the operations and/or objectives of the present teachings can also be used.

Second Illustrative Method

Figure 3:
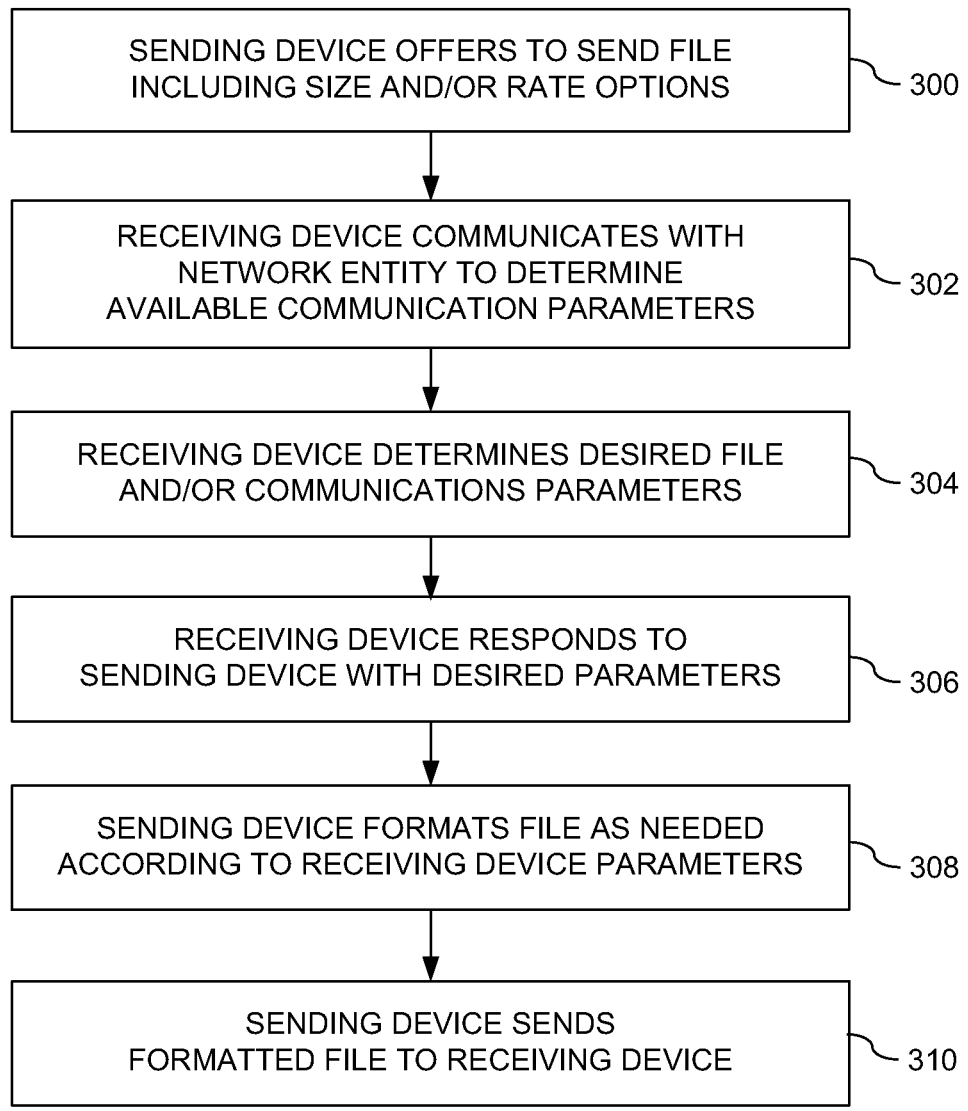
FIG. 3 depicts a flow diagram of a method according to one embodiment.

Reference is now made to FIG. 3, which depicts a flow diagram of a method in accordance with one embodiment. The method of FIG. 3 includes particular operations and order of execution. However, other methods including other operations, omitting one or more of the depicted operations, and/or proceeding in other orders of execution can also be used according to the present teachings. Thus, the method of FIG. 3 is illustrative and non-limiting in nature.

At 300, a sending device transmits an offer to provide a graphic image file to a proposed receiving device. For purposes of non-limiting example, it is assumed that the user computer 102 transmits an offer to provide a digital photograph to the user computer 106, by way of the network 116 and respective links 120 and 122. The offer is presumed to include information about the photograph such as, for example, resolution, original image size (e.g., twelve-hundred eighty by eight-hundred pixels) original overall file size (e.g., seven megabytes), etc.

At 302, the receiving device communicates (inquires) with a network entity to determine one or more available data communications parameters. For purposes of ongoing example, it is assumed that the user computer 106 inquires with the service provider 118 to determine how much data transfer balance remains on a monthly service agreement. The network entity responds with a value that the receiving device can then use in formulating a response to the sending device.

At 304, the receiving device determines desired parameters for the data file and/or communications used to provide that data file. For purposes of example, it is assumed that the user computer 106 determines that an image of not greater than one-thousand twenty-four by seven-hundred sixty-eight pixels, and not more than six megabytes total file size, is desired.

At 306, the receiving device responds by sending the desired parameters to the sending device. For purposes of the ongoing example, the user computer 106 sends the desired parameters determined at 304 above to the user computer 102 by way of the network 116 and the data (communication) links 120 and 122.

At 308, the sending device formats a data file as needed according to the receiving device parameters. For purposes of the ongoing example, it is assumed that the user computer 102 prepares (i.e., formats) a data file corresponding to the graphic image at the desired image size (one-thousand twenty-four by seven-hundred sixty-eight pixels). In so doing, the resulting data file has on overall size of five-point-two megabytes. As such, both desired parameters expressed by the user computer 106 are satisfied.

At 310, the sending device sends the formatted data file to the receiving device. For purposes of the example, the user computer 102 is assumed to transmit the formatted (i.e., derived) data file of the graphic image to the user computer 106. The client (user) of user computer 106 is also presumed to be debited by the service provider 118 for the corresponding data file transfer quantity.

The method of FIG. 3 depicts one embodiment of the present teachings in which an offer to share a graphic image file is transmitted, the receiving device inquires with the corresponding service provider as to the status of the monthly service agreement, the offer is responded to with one or more desired parameters according to the service provider inquiry, and a data file is provided to the receiving device in accordance with the desired parameters.

The foregoing method is illustrative of any number of methods contemplated by the present teachings. Numerous other methods consistent with the operations and/or objectives of the present teachings can also be used.

Third Illustrative Method

Figure 4:
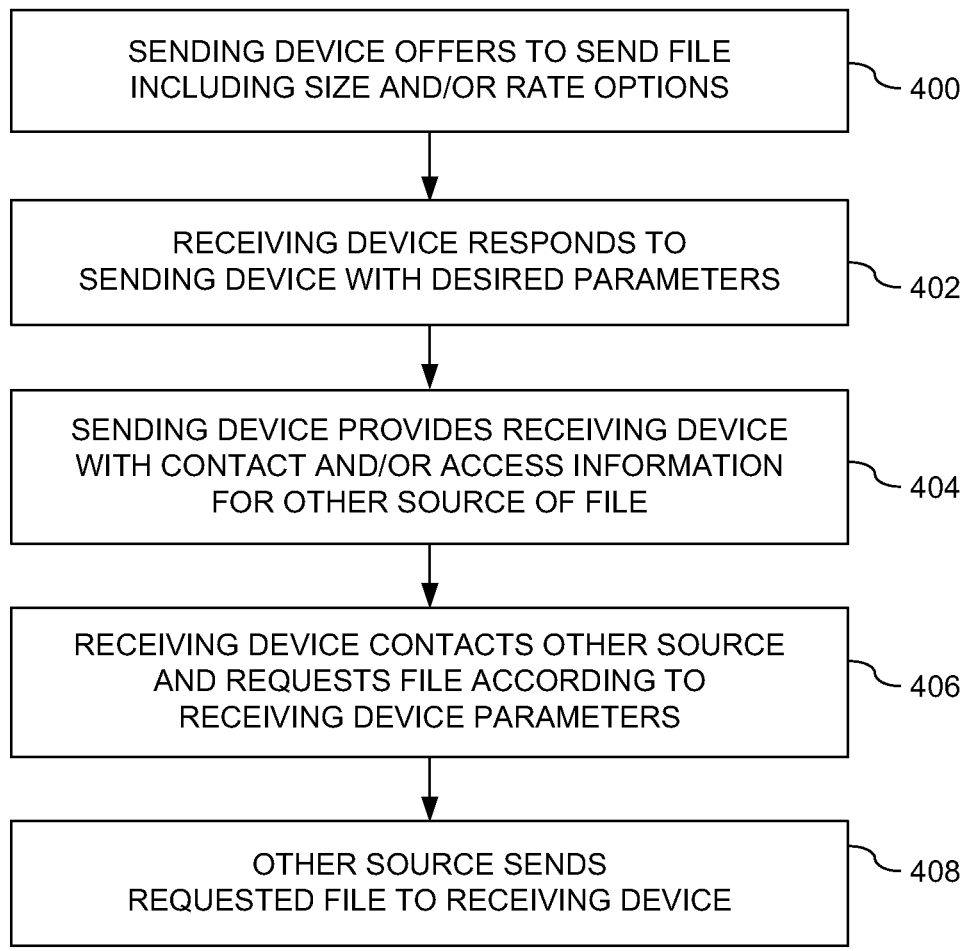
FIG. 4 depicts a flow diagram of a method according to one embodiment.

Reference is now made to FIG. 4, which depicts a flow diagram of a method in accordance with one embodiment. The method of FIG. 4 includes particular operations and order of execution. However, other methods including other operations, omitting one or more of the depicted operations, and/or proceeding in other orders of execution can also be used according to the present teachings. Thus, the method of FIG. 4 is illustrative and non-limiting in nature.

At 400, a sending device transmits an offer to provide a graphic image file to a proposed receiving device. For purposes of non-limiting example, it is assumed that the user computer 102 transmits an offer to provide a digital photograph to the user computer 106, by way of the network 116 and respective links 120 and 122. The offer is presumed to include information about the photograph such as, for example, resolution, original image size (e.g., one-thousand twenty-four by seven-hundred sixty-eight pixels) original overall file size (e.g., seven megabytes), etc.

At 402, the receiving device responds with desired parameters for the graphic image file. Such parameters can include an overall file size. For purposes of example, it is assumed that the user computer 106 responds to the user computer 102 with a desired image size of twelve-hundred eighty by eight-hundred pixels.

At 404, the sending device provides the receiving device with contact and/or address information for another (i.e., third-party) source for the graphic image. This is done because the desired parameters sent by the receiving device cannot be satisfied with the data available at the sending device. The information can include, for non-limiting example, an Internet Protocol (i.e., IP) address for the other source, one or more encryption keys, one or more passwords, a file identification name, etc., as needed in order to provide the receiving device with access to the graphic image. For purposes of the ongoing example, it is assumed that the user computer 102 provides a file designation name and an IP address for the file server 110 to the user computer 106.

At 406, the receiving device contacts the other source and requests the graphic image (or images) as a data file in accordance with the desired parameters. For purposes of the ongoing example, it is assumed that the user computer 106 contacts the file server 110 and provides the file designation name, as well as the desired parameters.

At 408, the other (i.e., third party) source derives a data file for the graphic image in accordance with the desired parameters and send the formatted file to the receiving device. For purposes of the ongoing example, it is assumed that the file server 110 derives and sends a formatted data file to the user computer 106.

The method of FIG. 4 depicts one embodiment of the present teachings in which an offer to share a graphic image file is transmitted, the offer is responded to with one or more desired parameters, the offering device provides a referral to a third-party source for the requested image file, the third-party source is contacted, and a data file is provided by the third-party source in accordance with the desired parameters. The foregoing method is illustrative of any number of methods contemplated by the present teachings. Numerous other methods consistent with the operations and/or objectives of the present teachings can also be used.

First Illustrative Embodiment

Figure 5:
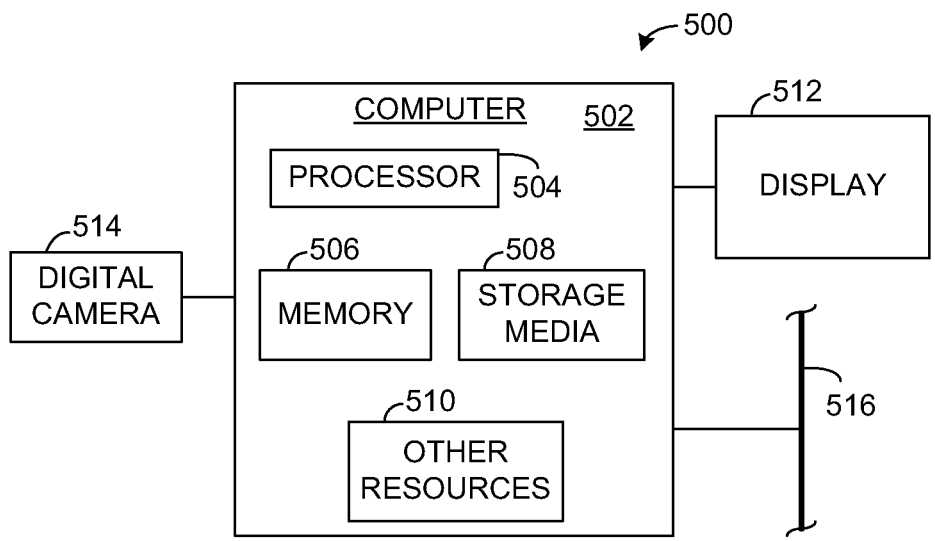
FIG. 5 depicts a block diagram of a computer system according to one embodiment.

Attention is now directed to FIG. 5, which depicts a block diagrammatic view of a client system 500. The client system 500 is illustrative and non-limiting with respect to the present teachings. Thus, the present teachings contemplate an essentially unlimited number of application scenarios in which graphic image file sharing is desirable.

The system 500 includes a computer 502. The computer 502 includes at least one processor 504, memory 506, and computer-readable storage media 508. The storage media 508 can be defined by any suitable storage media configured to store a program code that is executable by the processor(s) 504. Non-limiting examples of the storage media 508 include magnetic storage media (e.g., floppy disc, etc.), optical storage media (e.g., compact disc, etc.), programmable read-only memory (PROM), erasable programmable read-only memory (EPROM), random-access memory (RAM), etc. Other suitable types of storage media 508 can also be used. In turn, the memory 506 can be defined by any suitable solid-state memory accessible by the processor(s) 504.

The computer 502 includes other resources 510. Non-limiting examples of other resources 510 include one or more power supplies, input/output circuitry, a video graphics card, an audio card, speakers, security devices, etc. One having ordinary skill in the computing and related arts can appreciate that the computer 502 can be defined by known means and inclusive of various resources as required and/or desired. Further elaboration on the other resources 510 is not needed to understand the present teachings.

The system 500 also includes an electronic display 512 that is coupled to the computer 502. The electronic display. 512 is configured to display images (still and video) at one or more levels of image resolution and/or one or more values of image size. Furthermore, the electronic display 512 is defined by some overall dimensions (i.e., X by Y inches, etc.). The electronic display 512 displays images in accordance with electronic signals received from the computer 502.

The system 500 also includes a digital camera 514. The digital camera 514 is configured to record still and/or video images as respective digital files and to provide those files to the computer 502 where they can be stored, viewed, manipulated via appropriate software, etc. The system 500 further includes network 516, which provides bidirectional data communication between the computer 502 and one or more other entities (e.g., other computers, storage servers, display devices, etc.). The network 516 can be defined by a local-area network (LAN), the Internet, etc.

During typical operation, the client system 500 performs as follows: the digital camera 514 is used to record one or still images. The respective images, in the form of digital files, are communicated to the computer 502 where they are stored via memory 506, storage media 508, etc. The respective digital files are characterized by various parameters such as, for non-limiting example, image size (i.e., M by N pixels), overall file size (i.e., Z megabytes), color resolution (e.g., 32 bit color), and so on. The user of the computer 502 can then offer to share these images with other users by way of the network 516.

Another user is assumed to respond to the offer for one or more of the images by providing desired parameters therefore. For example, another user can request a particular image that was offered, specifying that the overall file size should not exceed four megabytes. For purposes of the example, it is assumed that the original file size is six megabytes. The computer 502 responds to the request, either automatically or under user initiation, by deriving a formatted data file corresponding to the requested parameters. For example, reduction of the color resolution from 32 bit to 24 bit color is presumed to be sufficient to reduce the overall file size to less than 4 megabytes. The computer then transmits the formatted data file to the device of the receiving user.

The foregoing scenario is illustrative of any number of such operations that can be performed in accordance with the present teachings. It is presumed that one or more aspects of the present teachings can be automatically performed at either or both of the sending and receiving devices by way of dedicated-purpose circuitry, program code executable by respective processors, state-machine electronics, or other suitable mechanism. Furthermore, such operations can be performed by way of prompting a user for input and/or automatic access to previously specified user preferences.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A method, comprising:
communicating an offer to provide at least one graphic image from a first device to a second device, the offer communicated by way of a network linking the first device to the second device;
receiving a desired overall file size for the at least one graphic image from the second device;
formatting a data file representing the at least one graphic image in accordance with the desired overall file size; and
communicating the data file from the first device to the second device by way of the network.

2. The method according to claim 1, the at least one graphic image defined by a video.

3. The method according to claim 2, the formatting the data file including dropping one or more frames from the video in accordance with the desired overall file size.

4. The method according to claim 1, the at least one graphic image defined by an original overall file size, the desired overall file size being different than the original overall file size.

5. The method according to claim 1, the at least one graphic image defined by an original resolution, the data file defined by a desired resolution different than the original resolution.

6. The method according to claim 1, the desired overall file size corresponding to a cost of service agreement between the second device and a third party, the third party providing a communications link from the network to the second device.

7. A method, comprising:
receiving an offer for at least one graphic image from a first device at a second device, the offer provided by way of a network;
determining one or more desired parameters for the at least one graphic image at the second device, at least one of the desired parameters corresponding to an overall file size for the at least one graphic image;
communicating the one or more desired parameters from the second device to the first device by way of the network; and
receiving a data file corresponding to the at least one graphic image at the second device, the data file formatted in accordance with the one or more desired parameters.

8. The method according to claim 7, at least one of the desired parameters corresponding to capabilities of at least an electronic display or a printer of the second device.

9. The method according to claim 7, the overall file size corresponding to a service cost agreement between the second device and a third party, the third party providing a communications link between the network and the second device.

10. The method according to claim 7, the overall file size corresponding to a bandwidth capability of a communications link between the second device and the network, the communications link provided by a third party.

11. The method according to claim 7, the determining one or more desired parameters performed according to at least one user preference input to the second device.

12. The method according to claim 7, the data file received at the second device from a source other than the first device.

13. A system, comprising
a network;
a first device coupled to the network and configured to provide at least one graphic image as a data file formatted in accordance with one or more parameters;
a second device coupled to the network and configured to receive an offer for the at least one graphic image from the first device, the second device further configured to respond to the offer with one or more desired parameters for the at least one graphic image, the desired parameters including an overall file size for the data file.

14. The system according to claim 13 further comprising a service provider configured to provide a communications link between the second device and the network, the second device further configured to define at least one of the desired parameters in accordance with a service arrangement with the service provider.

15. The system according to claim 13 further comprising a third party coupled to the network and configured to provide a data file formatted in accordance with the desired parameters to the second device, the third party being distinct from the first device.

\* \* \* \* \*